US011099660B2

(12) United States Patent
Klein et al.

(10) Patent No.: US 11,099,660 B2
(45) Date of Patent: Aug. 24, 2021

(54) USER INTERFACE FOR DIGITAL INK MODIFICATION

(71) Applicant: Microsoft Technology Licensing, LLC, Redmond, WA (US)

(72) Inventors: Christian Klein, Duvall, WA (US); Jan-Kristian Markiewicz, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 387 days.

(21) Appl. No.: 15/687,812

(22) Filed: Aug. 28, 2017

(65) Prior Publication Data

US 2019/0064938 A1    Feb. 28, 2019

(51) Int. Cl.

| | |
|---|---|
| *G06F 3/0346* | (2013.01) |
| *G06F 3/0354* | (2013.01) |
| *G09G 5/14* | (2006.01) |
| *G06F 1/16* | (2006.01) |
| *G06F 3/0488* | (2013.01) |

(Continued)

(52) U.S. Cl.

CPC .......... *G06F 3/0346* (2013.01); *G06F 1/1641* (2013.01); *G06F 1/1647* (2013.01); *G06F 1/1677* (2013.01); *G06F 3/04883* (2013.01); *G06F 40/171* (2020.01); *G09G 5/14* (2013.01); *G06F 1/1681* (2013.01); *G06F 3/03545* (2013.01); *G06F 3/04855* (2013.01); *G09G 2340/0492* (2013.01); *G09G 2354/00* (2013.01); *G09G 2360/04* (2013.01)

(58) Field of Classification Search

CPC .... G06F 3/0346; G06F 40/171; G06F 1/1641; G06F 3/04883; G06F 1/1647; G06F 1/1677; G06F 3/03545; G06F 1/1681; G06F 3/04855; G09G 5/14; G09G 2340/0492; G09G 2354/00; G09G 2360/04

See application file for complete search history.

(56) References Cited

U.S. PATENT DOCUMENTS 8,898,771 B1 * 11/2014 Kim ................. G06F 15/00 700/91
9,244,612 B1 * 1/2016 Azenkot ............ G06F 3/04883
(Continued)

FOREIGN PATENT DOCUMENTS

EP    2942705 A1    11/2015

OTHER PUBLICATIONS

"International Search Report and Written Opinion Issued in PCT Application No. PCT/US2018/038388", dated Sep. 7, 2018, 10 Pages.

*Primary Examiner* — Stephen S Hong
*Assistant Examiner* — Ahamed I Nazar
(74) *Attorney, Agent, or Firm* — International IP Law Group, PLLC

(57) ABSTRACT

A method for detecting digital ink described herein can include detecting an environmental characteristic of a system. The method can also include modifying a user interface mode based on the environmental characteristic, the user interface mode to modify an input panel of a first display screen of a user interface for detecting the digital ink. Furthermore, the method can also include storing the digital ink provided via the user interface and displaying the stored digital ink in a second display screen of the user interface.

20 Claims, 6 Drawing Sheets

(51) Int. Cl.
*G06F 40/171* (2020.01)
*G06F 3/0485* (2013.01)

(56) References Cited

U.S. PATENT DOCUMENTS

| | | | | |
|---|---|---|---|---|
| 2003/0001899 A1* | 1/2003 | Partanen | G06F 3/04883 | 715/800 |
| 2003/0038788 A1* | 2/2003 | Demartines | G06F 3/0485 | 345/173 |
| 2004/0263486 A1* | 12/2004 | Seni | G06F 3/0485 | 345/173 |
| 2009/0066660 A1* | 3/2009 | Ure | G06F 3/023 | 345/173 |
| 2011/0193939 A1* | 8/2011 | Vassigh | G06F 3/017 | 348/46 |
| 2014/0225820 A1* | 8/2014 | Schwesinger | G06F 3/011 | 345/156 |
| 2015/0148019 A1* | 5/2015 | Michaelis | H04M 1/72563 | 455/418 |
| 2015/0221065 A1* | 8/2015 | Kim | G06T 3/40 | 345/660 |
| 2016/0148046 A1 | 5/2016 | Zhang et al. | | |
| 2017/0185289 A1* | 6/2017 | Kim | G06F 1/1641 | |

\* cited by examiner

200

300A

300B

300C

300D

300E

300F

USER INTERFACE FOR DIGITAL INK MODIFICATION

BACKGROUND

As mobile electronic devices include faster processors, additional memory, and additional components, the mobile electronic devices are used more frequently in place of traditional computing devices. Accordingly, users of the mobile electronic devices execute applications related to word processing, spreadsheet editing, and photo editing, among others. In some examples, users can provide input for applications using a stylus device that generates digital ink based on contact with a display device. The digital ink, as referred to herein, can include any suitable handwritten text, diagrams, and the like, provided by a stylus contacting a display device.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

An embodiment described herein includes a system for detecting digital ink that includes a processor and a memory device coupled to the processor, the memory device to store instructions that, in response to an execution by the processor, cause the processor to detect an environmental characteristic of the system. The plurality of instructions can also cause the processor to modify a user interface mode based on the environmental characteristic, the user interface mode to modify an input panel of a first display screen of a user interface for detecting the digital ink. The plurality of instructions can also cause the processor to store the digital ink provided via the user interface and display the stored digital ink in a second display screen of the user interface.

In another embodiment, a method for detecting digital ink can include detecting an environmental characteristic of a system and modifying a user interface mode based on the environmental characteristic, the user interface mode to modify an input panel of a first display screen of a user interface for detecting the digital ink. The method can also include storing the digital ink provided via the user interface and displaying the stored digital ink in a second display screen of the user interface.

In yet another embodiment, one or more computer-readable storage media for detecting digital ink can include a plurality of instructions that, in response to being executed by a processor, cause the processor to detect an environmental characteristic of a system. The plurality of instructions can also cause the processor to modify a user interface mode based on the environmental characteristic, the user interface mode to modify an input panel of a first display screen of a user interface for detecting the digital ink. Additionally, the plurality of instructions can cause the processor to store the digital ink provided via the user interface and display the stored digital ink in a second display screen of the user interface.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

The following detailed description may be better understood by referencing the accompanying drawings, which contain specific examples of numerous features of the disclosed subject matter.

DETAILED DESCRIPTION

Using a digital pen to hand write on a digital device can often be uncomfortable and tedious because the digital device may be small or the posture of the digital device may not provide a surface to rest a user's palm. Techniques described herein provide a posture-optimized location to provide digital ink on a device and then send the input or digital ink to a content canvas or display device. Additional techniques, such as automatically scaling the digital ink, can also be applied to further improve the precision of providing handwritten input as digital ink on a device.

In some embodiments, techniques described herein provide a system for detecting digital ink with a modified user interface. The user interface can be automatically modified by a system based on environmental characteristics of the system. For example, the user interface for detecting digital ink can be modified based on whether the device is being held by a user, whether the device is on a fixed flat surface, and the like. In some embodiments, the system can display the user interface via multiple display screens. For example, the system can include two display screens adjacent to a shared hinge, wherein the two display screens can display the user interface for detecting digital ink. In one embodiment, one of the display screens can detect digital ink and the other display screen can display digital ink that has been stored or captured. In some embodiments, the user interface can also be modified to store or capture digital ink using various techniques based on environmental characteristics of a system.

The techniques described herein enable modifying a user interface for detecting digital ink based on an environmental characteristic of a device. The techniques described herein also enable committing digital ink to a stored format based on the environmental characteristic.

Figure 1:
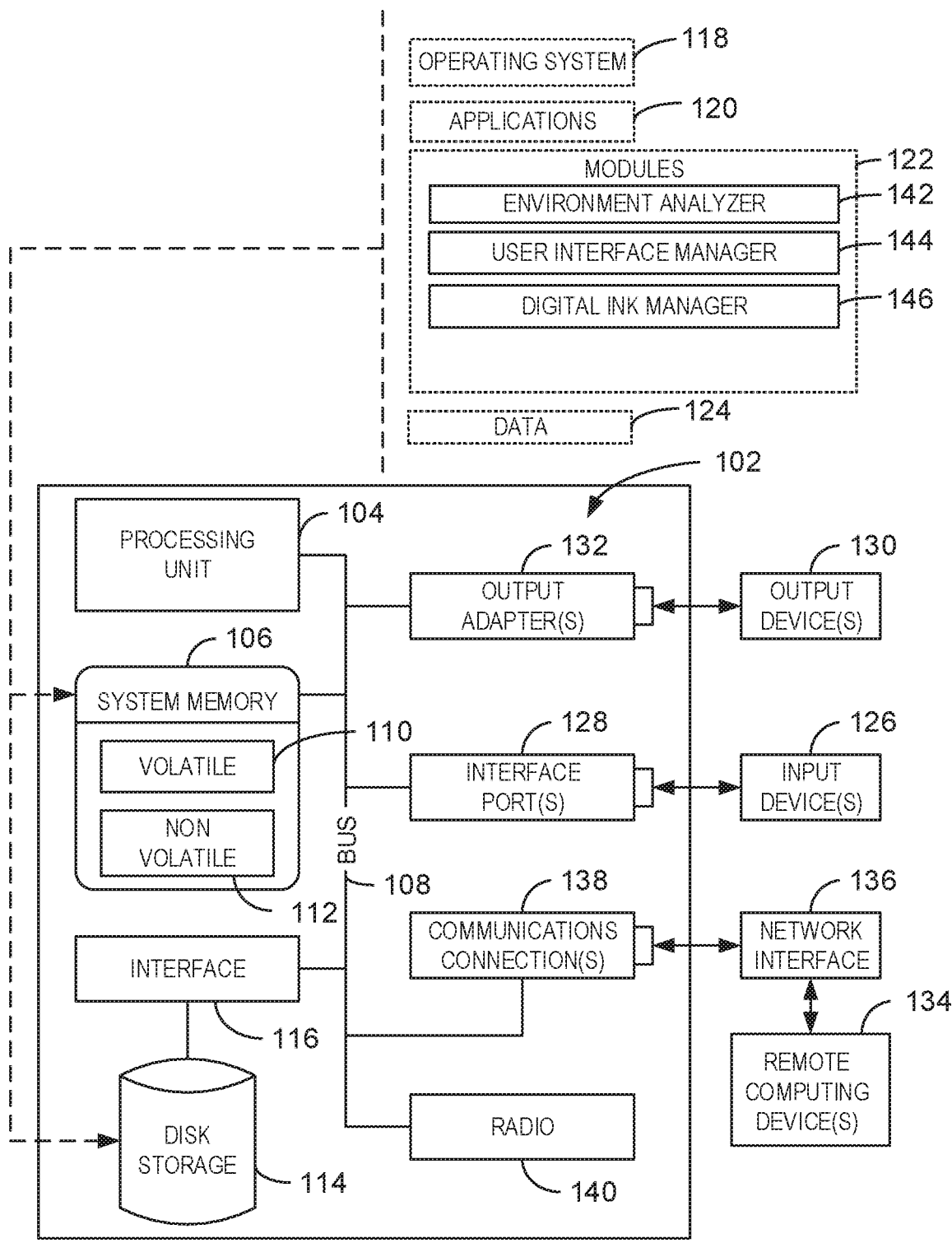
FIG. 1 is a block diagram of an example of a computing system that can detect digital ink with a modified user interface.

As a preliminary matter, some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1 discussed below, provide details regarding different systems that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, and the like, or any combination of these implementations. As used herein, hardware may include computer systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like.

FIG. 1 is a block diagram of an example of a computing system that can detect digital ink with a modified user interface. The example system 100 includes a computing device 102. The computing device 102 includes a processing unit 104, a system memory 106, and a system bus 108. In some examples, the computing device 102 can be a mobile device, a laptop device, a tablet device, a gaming console, a personal computer (PC), an accessory console, a gaming controller, among other computing devices. In some examples, the computing device 102 can be a node in a cloud network.

The system bus 108 couples system components including, but not limited to, the system memory 106 to the processing unit 104. The processing unit 104 can be any of various available processors. Dual microprocessors and other multiprocessor architectures also can be employed as the processing unit 104.

The system bus 108 can be any of several types of bus structure, including the memory bus or memory controller, a peripheral bus or external bus, and a local bus using any variety of available bus architectures known to those of ordinary skill in the art. The system memory 106 includes computer-readable storage media that includes volatile memory 110 and nonvolatile memory 112.

The basic input/output system (BIOS), containing the basic routines to transfer information between elements within the computer 102, such as during start-up, is stored in nonvolatile memory 112. By way of illustration, and not limitation, nonvolatile memory 112 can include read-only memory (ROM), programmable ROM (PROM), electrically programmable ROM (EPROM), electrically erasable programmable ROM (EEPROM), or flash memory.

Volatile memory 110 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 102 also includes other computer-readable media, such as removable/non-removable, volatile/nonvolatile computer storage media. FIG. 1 shows, for example a disk storage 114. Disk storage 114 includes, but is not limited to, devices like a magnetic disk drive, floppy disk drive, tape drive, Jaz drive, Zip drive, LS-210 drive, flash memory card, or memory stick.

In addition, disk storage 114 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 114 to the system bus 108, a removable or non-removable interface is typically used such as interface 116.

It is to be appreciated that FIG. 1 describes software that acts as an intermediary between users and the basic computer resources described in the suitable operating environment 100. Such software includes an operating system 118. Operating system 118, which can be stored on disk storage 114, acts to control and allocate resources of the computer 102.

System applications 120 take advantage of the management of resources by operating system 118 through program modules 122 and program data 124 stored either in system memory 106 or on disk storage 114. It is to be appreciated that the disclosed subject matter can be implemented with various operating systems or combinations of operating systems.

A user enters commands or information into the computer 102 through input devices 126. Input devices 126 include, but are not limited to, a pointing device, such as, a mouse, trackball, stylus, and the like, a keyboard, a microphone, a joystick, a satellite dish, a scanner, a TV tuner card, a digital camera, a digital video camera, a web camera, any suitable dial accessory (physical or virtual), and the like. In some examples, an input device can include Natural User Interface (NUI) devices. NUI refers to any interface technology that enables a user to interact with a device in a "natural" manner, free from artificial constraints imposed by input devices such as mice, keyboards, remote controls, and the like. In some examples, NUI devices include devices relying on speech recognition, touch and stylus recognition, gesture recognition both on screen and adjacent to the screen, air gestures, head and eye tracking, voice and speech, vision, touch, gestures, and machine intelligence. For example, NUI devices can include touch sensitive displays, voice and speech recognition, intention and goal understanding, and motion gesture detection using depth cameras such as stereoscopic camera systems, infrared camera systems, RGB camera systems and combinations of these. NUI devices can also include motion gesture detection using accelerometers or gyroscopes, facial recognition, three-dimensional (3D) displays, head, eye, and gaze tracking, immersive augmented reality and virtual reality systems, all of which provide a more natural interface. NUI devices can also include technologies for sensing brain activity using electric field sensing electrodes. For example, a NUI device may use Electroencephalography (EEG) and related methods to detect electrical activity of the brain. The input devices 126 connect to the processing unit 104 through the system bus 108 via interface ports 128. Interface ports 128 include, for example, a serial port, a parallel port, a game port, and a universal serial bus (USB).

Output devices 130 use some of the same type of ports as input devices 126. Thus, for example, a USB port may be used to provide input to the computer 102 and to output information from computer 102 to an output device 130.

Output adapter 132 is provided to illustrate that there are some output devices 130 like monitors, speakers, and printers, among other output devices 130, which are accessible via adapters. The output adapters 132 include, by way of illustration and not limitation, video and sound cards that provide a means of connection between the output device 130 and the system bus 108. It can be noted that other devices and systems of devices provide both input and output capabilities such as remote computing devices 134.

The computer 102 can be a server hosting various software applications in a networked environment using logical connections to one or more remote computers, such as remote computing devices 134. The remote computing devices 134 may be client systems configured with web browsers, PC applications, mobile phone applications, and the like. The remote computing devices 134 can be a personal computer, a server, a router, a network PC, a workstation, a microprocessor based appliance, a mobile phone, a peer device or other common network node and the like, and typically includes many or all of the elements described relative to the computer 102.

Remote computing devices 134 can be logically connected to the computer 102 through a network interface 136 and then connected via a communication connection 138, which may be wireless. Network interface 136 encompasses wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection 138 refers to the hardware/software employed to connect the network interface 136 to the bus 108. While communication connection 138 is shown for illustrative clarity inside computer 102, it can also be external to the computer 102. The hardware/software for connection to the network interface 136 may include, for exemplary purposes, internal and external technologies such as, mobile phone switches, modems including regular telephone grade modems, cable modems and DSL modems, ISDN adapters, and Ethernet cards.

The computer 102 can further include a radio 140. For example, the radio 140 can be a wireless local area network radio that may operate one or more wireless bands. For example, the radio 140 can operate on the industrial, scientific, and medical (ISM) radio band at 2.4 GHz or 5 GHz. In some examples, the radio 140 can operate on any suitable radio band at any radio frequency.

The computer 102 includes one or more modules 122, such as an environment analyzer 142, a user interface manager 144, and a digital ink manager 146. In some embodiments, the environment analyzer 142 can detect an environmental characteristic of the system. As discussed in greater detail below in relation to FIG. 2, the environmental characteristic can include any suitable sensor data that indicates if a system is in motion, in a fixed position, a viewing angle between multiple display devices, and the like. In some examples, the user interface manager 144 can also monitor sensor data for the computer 102 from any number of sensors such as a gyroscope, an accelerometer, a magnetometer, and the like. In some embodiments, a user interface manager 144 can modify a user interface mode based on the environmental characteristic. In some examples, the user interface mode can modify an input panel of a first display screen of a user interface for detecting the digital ink. In some embodiments, a digital ink manager 146 can store the digital ink provided via the user interface. The digital ink manager 146 can also display the stored digital ink in a second display screen of the user interface. In some embodiments, the first display screen and the second display screen can be separate regions of a single display screen.

It is to be understood that the block diagram of FIG. 1 is not intended to indicate that the computing system 102 is to include all of the components shown in FIG. 1. Rather, the computing system 102 can include fewer or additional components not illustrated in FIG. 1 (e.g., additional applications, additional modules, additional memory devices, additional network interfaces, etc.). Furthermore, any of the functionalities of the environment analyzer 142, user interface manager 144, and digital ink manager 146 may be partially, or entirely, implemented in hardware and/or in the processing unit (also referred to herein as a processor) 104. For example, the functionality may be implemented with an application specific integrated circuit, in logic implemented in the processing unit 104, or in any other device.

Figure 2:
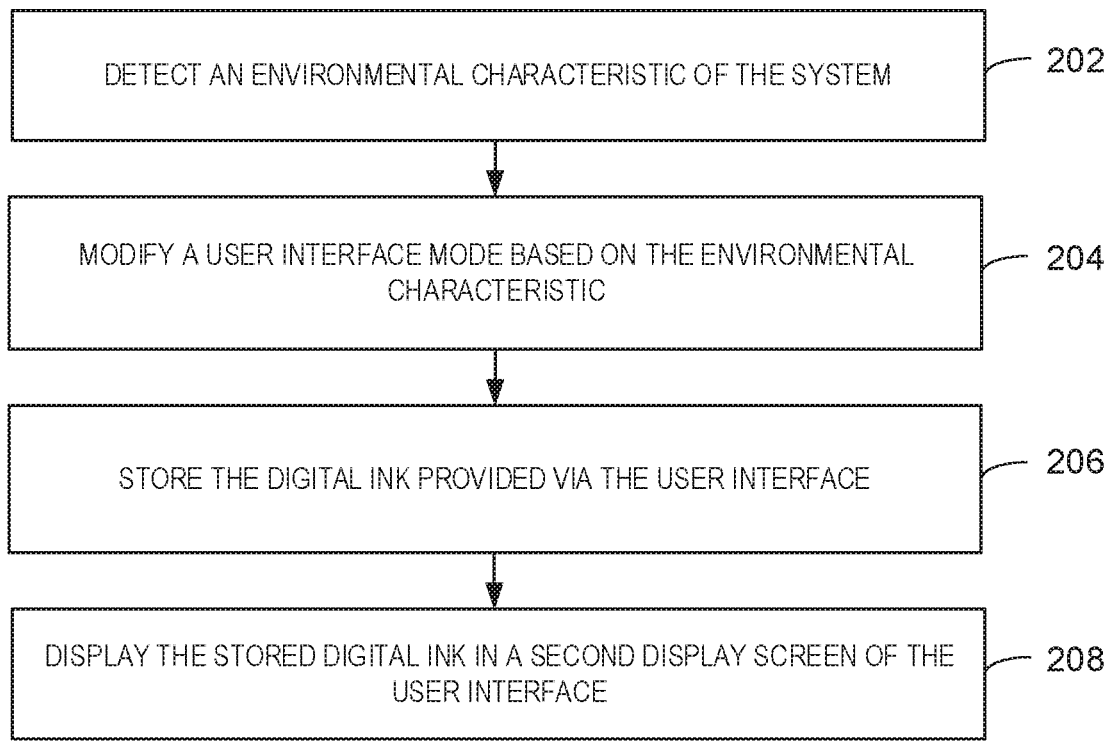
FIG. 2 is a process flow diagram of an example method for detecting digital ink with a modified user interface.

FIG. 2 is a process flow diagram of an example method for detecting digital ink with a modified user interface. The method 200 can be implemented with any suitable computing device, such as the computing system 102 of FIG. 1.

At block 202, an environment analyzer 142 can detect an environmental characteristic of the system. In some embodiments, the environmental characteristic can include a determination of whether the system is in motion or at rest. For example, the environmental analyzer 142 can detect sensor data from any suitable sensors such as a gyroscope, an accelerometer, a compass, a global positioning system sensor, and the like. The environmental analyzer 142 can aggregate sensor data from any suitable number of sensors to determine if the system is in motion or at a fixed location. In some embodiments, the environmental characteristic can also include an angle of a hinge residing between a first display screen and a second display screen. For example, the angle of the hinge can indicate a viewing angle between two display screens of a system. The angle can also indicate contextual information regarding how a user is holding the system or viewing the system. In some embodiments, additional sensor data from touch sensors and/or grip sensors can also indicate how a user is holding a device or viewing the device.

Furthermore, the environmental characteristic can also include a determination of whether the first display screen and the second display screen are viewed in a landscape mode or a portrait mode. The environmental characteristic can also include a determination of whether a user of the system is sitting or standing. For example, the environmental analyzer 142 can access a camera coupled to the system to detect a posture of a user to determine if a user is standing, walking, or sitting. In some embodiments, the user interface mode can be modified based on the detected environmental characteristics as shown below in relation to block 204.

At block 204, a user interface manager 144 can modify a user interface mode based on the environmental characteristic. In some examples, the user interface mode can indicate how to display an input panel of a first display screen of a user interface for detecting the digital ink. In some examples, the input panel can show a region of the user interface that corresponds to detected digital ink. For example, a mobile device with two or more display screens may use one display screen to display an input panel and a second display screen to display previously stored information as described below in relation to block 208.

In some embodiments, the user interface manager 144 can detect a two-screen display and display the input panel via a bottom screen or a top screen dependent upon an orientation and posture of a user in relation to the device. In some examples, the user interface manager 144 can display the input panel in a portion of a display screen to provide a dead space or a blocked portion on the display screen that ignores input. In some examples, the dead space can be used to rest a palm of a user while providing digital ink. The user interface manager 144 can determine the dead space region of a display screen based on whether a user is providing digital ink with a left hand or a right hand. In some embodiments, the user interface manager 144 can block input detection from a portion of the input panel of the user interface in response to detecting a user is standing or walking. In some examples, the user interface manager 144 can modify a size of the input panel based on environmental characteristics such as a device posture (flat, folded, tent, etc.), a device orientation (landscape/portrait), a hinge angle between two display screens, a determination of whether a device is in motion, a device grip, a pen grip/angle/handedness, a software context (e.g. based on a type of active application receiving digital ink, among others), and the like. In some examples, the user interface manager 144 can modify a size of the input panel based on any combination of the environmental characteristics listed above. In some examples, the user interface manager 144 can increase a size of the input panel in response to detecting a device is in motion. In some embodiments, the user interface manager 144 can also use any number of environmental characteristics to modify other aspects of the input panel. For example, the user interface manager 144 can modify the layout of an input panel, modify an interaction model (e.g. how text is committed) to an input panel, modify supported gestures within the input panel, modify a presence of user interface controls in the input panel, and modify machine learning algorithms associated with the user interface or input panel, etc.

In some embodiments, the user interface manager 144 can display an input panel with at least two lines, wherein digital ink can be stored from a first line in response to detecting digital ink in the second line. The user interface manager 144 can display an input panel with at least two lines in response to detecting a device is in a fixed location on a flat surface, which can enable a user to rest a palm beyond the edge of a device. In some embodiments, the user interface manager 144 can use the input panel to detect a mixture of text and at least one diagram in the digital ink and normalize the text and capture the diagram without normalization. For example, the user interface manager 144 can detect various sizes of digital ink and scale the digital ink to a consistent size as the digital ink is stored for display by a separate display device or content canvas. In some embodiments, the digital ink can also indicate a bold setting, an underlined setting, an italicized setting, a font color setting, or a font size setting, among others.

At block 206, a digital ink manager 146 can store the digital ink provided via the user interface. In some embodiments, the digital ink manager 146 can store the digital ink in response to a timer exceeding a predetermine threshold value. For example, the digital ink manager 146 can detect a predetermined period of time after which any digital ink provided to an input panel is to be stored or committed. In some examples, the timer can be initiated in response to a pen being lifted from a surface of a display screen. In some embodiments, the digital ink manager 146 can enable a hover region in response to detecting digital ink. The hover region can enable detecting a hovering pen over a portion of the input panel, which can result in automatically committing any digital ink provided to the input panel and clearing the input panel. In some embodiments, the hover region can be displayed visually or can be functional without a visual display.

In some embodiments, the digital ink manager 146 can store the digital ink in response to the digital ink being entered within a predetermined distance from the right edge of the first display screen of the user interface. For example, as the digital ink manager 146 determines that the digital ink provided to the input panel is approaching a right side of an input panel, the digital ink manager 146 can store or commit the digital ink and clear the input panel to enable additional digital ink to be detected. In some examples, the digital ink manager 146 can generate a scrollbar and digital ink can continuously scroll to the left as additional digital ink is provided. In some examples, the scroll bar can enable bringing content into view again in an input panel. In some embodiments, in response to detecting a store or commit action for detected digital ink, the digital ink manager 146 can use text recognition to separate text based handwriting versus drawings, shapes, and the like. In one example, the drawings, shapes, and the like can remain as digital ink while the text handwriting can be converted into any suitable digital characters. For example, the digital ink manager 146 can use a dictionary based optical character recognition technique, a phrase prediction technique based on machine learning algorithms, and the like, to convert the digital ink into digital characters.

In some examples, a digital ink manager 146 can provide a multi-line mode in the input panel to provide more writing area. In some embodiments, the digital ink manager 146 can provide the multi-line mode in response to detecting the device or the user is in a particular posture. For example, if the digital ink manager 146 detects that a user has placed a device on a table, the digital ink manager 146 can infer that the user can rest their palm on the table beyond the screen of the device. In this example, the digital ink manager 146 can provide two or more lines for providing digital ink. In some embodiments, the digital ink manager 146 can use the commit techniques described above based on a commit button, a timer, an auto-scroll, and the like. In some embodiments, the digital ink manager 146 can commit or store digital ink in response to detecting digital ink in a second line of the input panel. Similarly, the digital ink manager 146 can detect if there is content or digital ink on the second line as digital ink is provided to a first line of the input panel and commit the content or digital ink on the second line. Accordingly, the digital ink manager 146 can enable automatically storing digital ink by alternating the lines in which digital ink is provided within an input panel. In some examples, a final commit may be manually initiated with a user interface control, gesture, or a timer, among others.

At block 208, the digital ink manager 146 can also display the stored digital ink in a second display screen of the user interface. In some examples, a single display screen displays the user interface associated with the first display screen and the second display screen. In some examples, the digital ink manager 146 can normalize the digital ink provided to the input panel. For example, the digital ink manager 146 can modify or normalize the size of digital ink detected in the input panel to match a predetermined text size to be displayed in the second display screen. In some examples, the digital ink manager 146 can detect a combination of diagrams and text. The digital ink manager 146 can normalize the text from the digital ink while maintaining the size of the diagrams provided to the input panel. In some examples, the diagrams can include drawings, emoticons, and the like.

In one embodiment, the process flow diagram of FIG. 3 is intended to indicate that the blocks of the method 300 are to be executed in a particular order. Alternatively, in other embodiments, the blocks of the method 300 can be executed in any suitable order and any suitable number of the blocks of the method 300 can be included. Further, any number of additional blocks may be included within the method 300, depending on the specific application. For example, the method 300 can include detecting a selection of committed text from the second display screen and moving the selection to the input panel of the first display screen for a revision. In some examples, the method 300 can include detecting a selection of committed text from the second display screen and detecting an annotation corresponding to the committed text. In some embodiments, the user interface manager 144 can modify the user interface of the first screen, the second screen, or both screens in response to detecting a change in sensor data. For example, the user interface manager 144 can continuously modify the user interface based on changes in environmental characteristics detected from the sensor data and a configuration of the device. For example, the user interface manager 144 can modify the user interface in response to detecting a change of the device configuration from a laptop mode with two viewable display screens to a tablet mode with one viewing display screen.

Figure 3A:
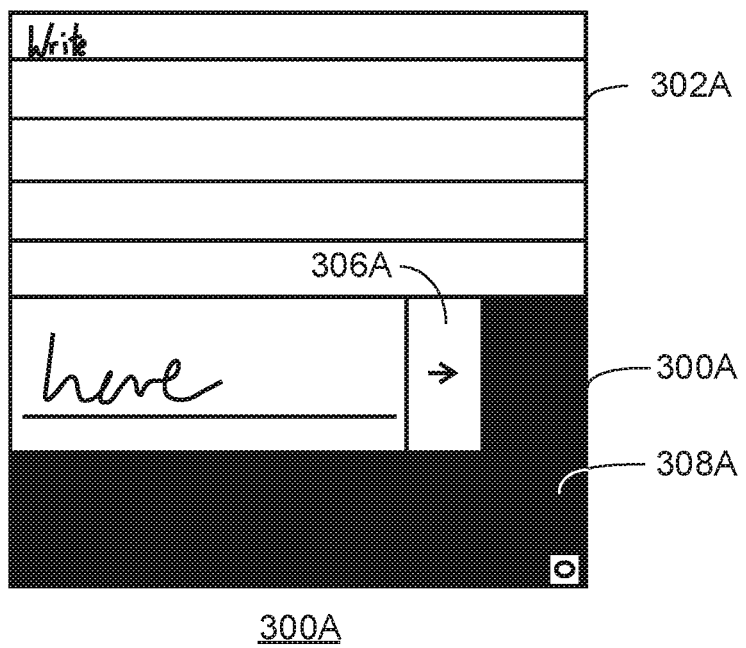
FIGS. 3A-3F are diagrams illustrating a user interface for detecting digital ink with a modified user interface.

FIGS. 3A-3E are diagrams illustrating techniques for detecting and committing or storing digital ink with a modified user interface. In FIG. 3A, the input panel 300A can be displayed adjacent to or below a separate content canvas or display panel 302A for displaying stored or committed digital ink. In the example of FIG. 3A, the word "write" has been previously entered into the input panel 300A and stored or committed to memory. Accordingly, the word "write" is displayed in the display panel 302A. The word "here" has been entered into the input panel 300A, but not yet stored or committed to memory. In some examples, a selection of the arrow 306A can result in the word "here" being stored or committed to memory. In some examples, a timer can determine when the word "here" is to be stored. For example, a timer can be initiated upon detecting digital ink and after a predetermined period of time has elapsed, the digital ink can be stored. In some embodiments, the timer can enable storing digital ink in response to detecting a pen is no longer in contact with the input panel 300A for a period of time. In some examples, a region 308A of the input panel 300A can be blocked or deactivated to provide support for a user's palm.

Figure 3B:
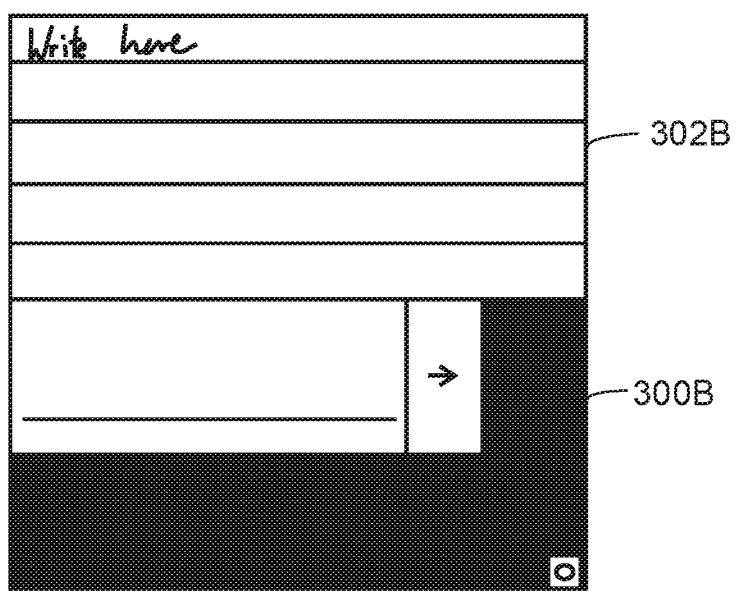

In FIG. 3B, the word "here" has been stored or committed to memory. Accordingly, the input panel 300B has been cleared to a blank state and the separate display panel 302B includes the stored words "write here."

Figure 3C:
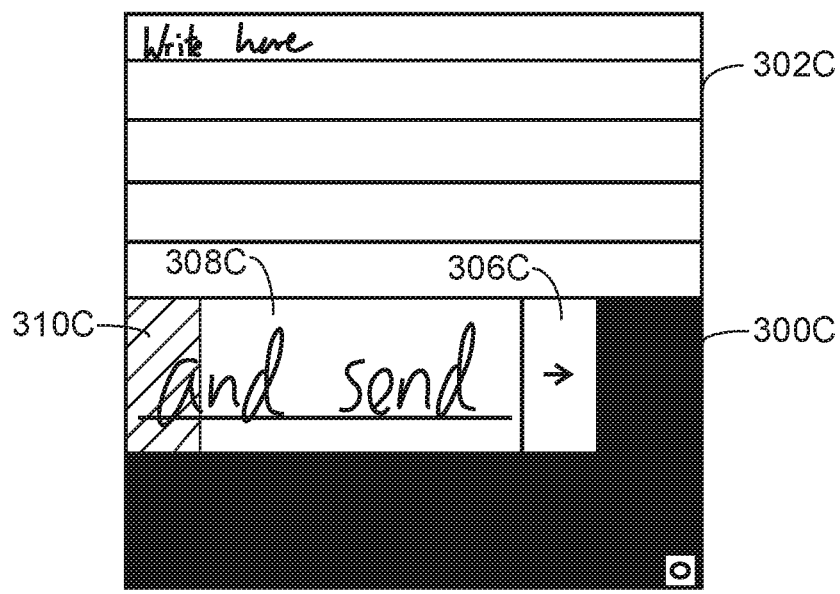

In FIG. 3C, the input panel 300C can scroll to the left as if a user is writing on a notepad. For example, the input panel 300C can scroll to the left as the user begins providing digital ink in the middle section 308C. In some examples, the words "and send" can be committed or stored to memory as the digital ink approaches the right edge of the middle section 308C. Alternatively, a selection of the arrow 306C can also commit the words "and send" or a timer may be used to commit the terms "and send." In some embodiments, a hover region 310C can enable detecting a hovering pen over a portion of the input panel 300C, which can result in automatically committing any digital ink provided to the input panel 300C and clearing the input panel 300C. In some examples, a scrollbar can be included in the input panel 300C to enable scrolling through digital ink previously provided to the input panel 300C but not yet stored and viewable in the display panel 302C.

Figure 3D:
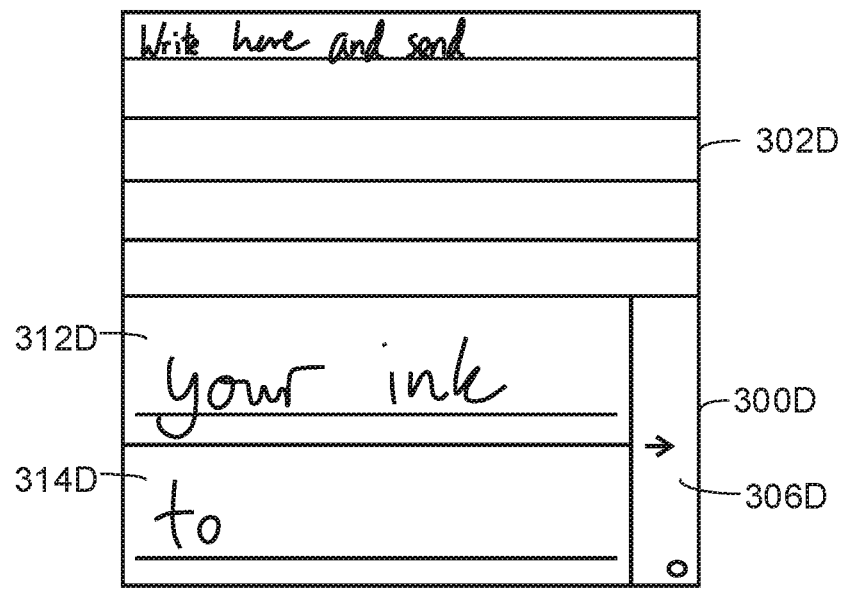

In FIG. 3D, an input panel 300D includes two lines 312D and 314D for detecting digital ink. The first line 312D includes the words "your ink" and the second line 314D includes the words "to." In some examples, as digital ink is detected in the second line 314D, any digital ink in the first line 312D can be stored or committed to memory. In one example, a selection of the arrow 306D can store or commit to memory the first line 312D and the second line 314D. In the illustrated example, the separate display panel 302D displays "write here and send" based on committed terms from FIGS. 3A-3C.

Figure 3E:
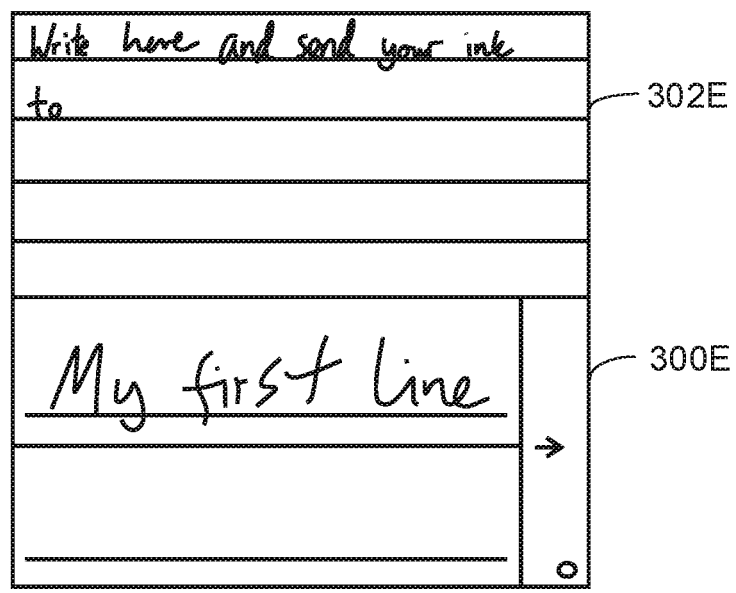

In FIG. 3E, an input panel 300E can detect the words "my first line." The separate display panel 302E can include the words "write here and send your ink to" based on committed words from FIGS. 3A-3D.

Figure 3F:
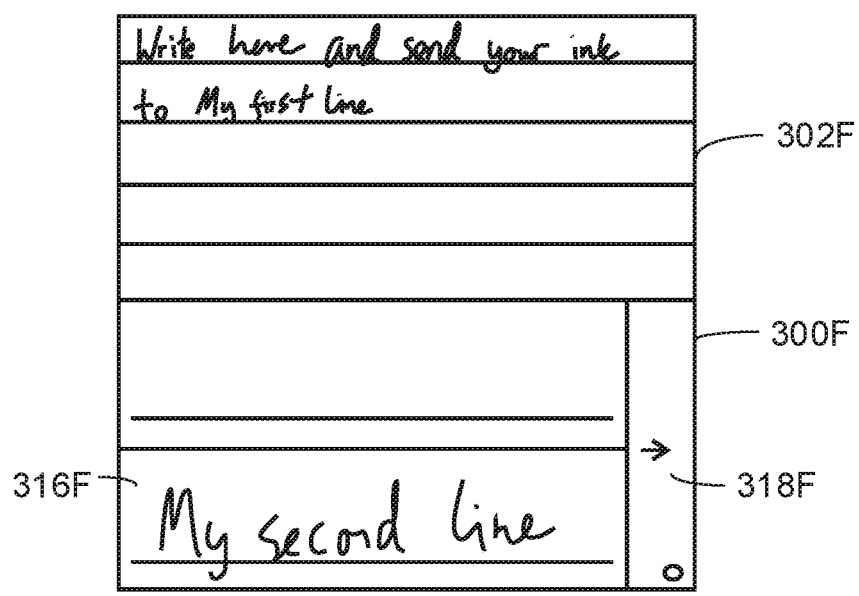

In FIG. 3F, an input panel 300F can detect the words "my second line" on the second line 316F of the input panel. The terms "my first line" from FIG. 3E can be committed or stored in response to detecting digital ink on the second like 316F. In some examples, the selection of the arrow 318F or a predetermined period of time passing can result in the words "my second line" being stored or committed. In the illustrated example, the separate display panel 302F displays the words "write here and send your ink to my first line" based on committed terms from FIGS. 3A-3E.

It is to be understood that the block diagram of FIGS. 3A-3F are not intended to indicate that the input panels 300A-300F are to include all of the components shown in FIGS. 3A-3F. Rather, input panels 300A-300E can include fewer or additional components not illustrated in FIGS. 3A-3F. In some embodiments, the input panels 300A-300F can include any suitable number of control elements such as text fields, labels, buttons, check boxes, and the like.

Figure 4:
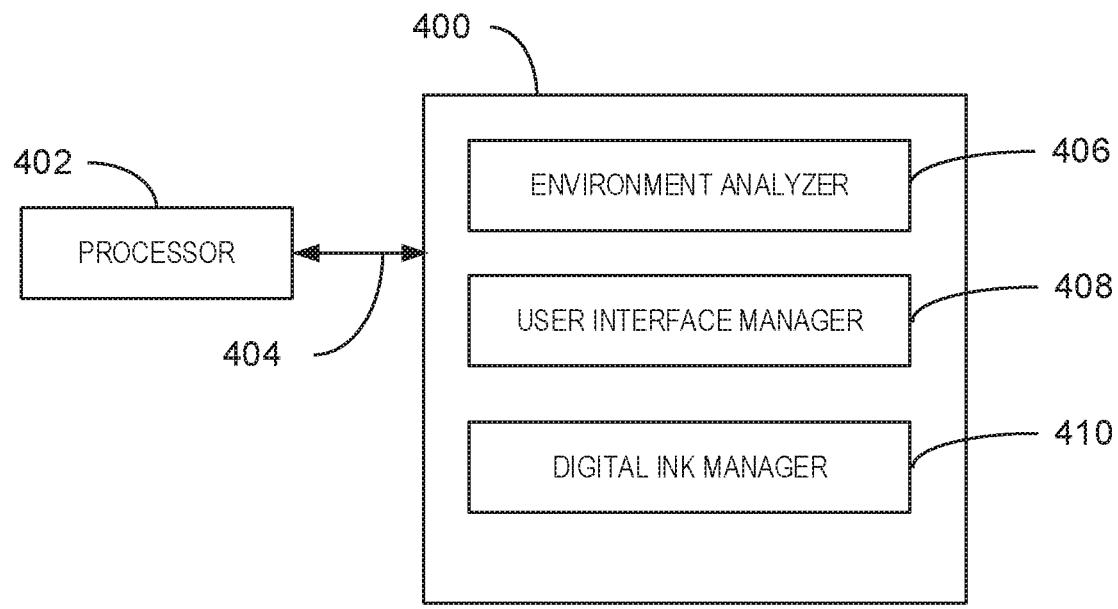
FIG. 4 is a block diagram of an example computer-readable storage media that can detect digital ink with a modified user interface.

FIG. 4 is a block diagram of an example computer-readable storage media that can detect digital ink with a modified user interface. The tangible, computer-readable storage media 400 may be accessed by a processor 402 over a computer bus 404. Furthermore, the tangible, computer-readable storage media 400 may include code to direct the processor 402 to perform the steps of the current method.

The various software components discussed herein may be stored on the tangible, computer-readable storage media 400, as indicated in FIG. 4. For example, the tangible computer-readable storage media 400 can include an environment analyzer 406 that can detect an environmental characteristic of the system. In some embodiments, a user interface manager 408 can modify a user interface mode based on the environmental characteristic. In some examples, the user interface mode can modify an input panel of a first display screen of a user interface for detecting the digital ink. In some embodiments, a digital ink manager 410 can store the digital ink provided via the user interface. The digital ink manager 410 can also display the stored digital ink in a second display screen of the user interface.

It is to be understood that any number of additional software components not shown in FIG. 4 may be included within the tangible, computer-readable storage media 400, depending on the specific application.

EXAMPLE 1

In one embodiment, a system for detecting digital ink includes a processor and a memory device coupled to the processor, the memory device to store instructions that, when executed by the processor, cause the processor to detect an environmental characteristic of the system. The plurality of instructions can also cause the processor to modify a user interface mode based on the environmental characteristic, the user interface mode to modify an input panel of a first display screen of a user interface for detecting the digital ink. The plurality of instructions can also cause the processor to store the digital ink provided via the user interface and display the stored digital ink in a second display screen of the user interface.

Alternatively, or in addition, the environmental characteristic comprises a determination of whether the system is in motion or at a rest. Alternatively, or in addition, the environmental characteristic comprises an angle of a hinge residing between the first display screen and the second display screen. Alternatively, or in addition, the environmental characteristic comprises a determination of whether the first display screen and the second display screen are viewed in a landscape mode or a portrait mode. Alternatively, or in addition, the environmental characteristic comprises a determination of whether a user of the system is sitting, walking, or standing. Alternatively, or in addition, the plurality of instructions cause the processor to store the digital ink in response to a timer exceeding a predetermined threshold value. Alternatively, or in addition, the plurality of instructions cause the processor to store the digital ink in response to the digital ink being entered within a predetermined distance from a right edge of the first display screen of the user interface. Alternatively, or in addition, the plurality of instructions cause the processor to block input detection from a portion of the first display screen in response to detecting a user is standing or walking. Alternatively, or in addition, the plurality of instructions cause the processor to normalize the digital ink provided to the input panel. Alternatively, or in addition, the input panel comprises at least two lines and digital ink is to be stored from a first line in response to detecting digital ink in a second line. Alternatively, or in addition, the plurality of instructions cause the processor to detect a mixture of text and at least one diagram in the digital ink and normalize the text and capture the diagram without normalization. Alternatively, or in addition, the plurality of instructions cause the processor to detect a selection of committed text from the second display screen and move the selection to the input panel of the first display screen for a revision. Alternatively, or in addition, the plurality of instructions cause the processor to detect a selection of committed text from the second display screen and detect an annotation corresponding to the committed text. Alternatively, or in addition, a single display screen displays the user interface associated with the first display screen and the second display screen.

EXAMPLE 2

In another embodiment, a method for detecting digital ink can include detecting an environmental characteristic of a system and modifying a user interface mode based on the environmental characteristic, the user interface mode to modify an input panel of a first display screen of a user interface for detecting the digital ink. The method can also include storing the digital ink provided via the user interface and displaying the stored digital ink in a second display screen of the user interface.

Alternatively, or in addition, the environmental characteristic comprises a determination of whether the system is in motion or at a rest. Alternatively, or in addition, the environmental characteristic comprises an angle of a hinge residing between the first display screen and the second display screen. Alternatively, or in addition, the environmental characteristic comprises a determination of whether the first display screen and the second display screen are viewed in a landscape mode or a portrait mode. Alternatively, or in addition, the environmental characteristic comprises a determination of whether a user of the system is sitting, walking, or standing. Alternatively, or in addition, the method includes storing the digital ink in response to a timer exceeding a predetermined threshold value. Alternatively, or in addition, the method includes storing the digital ink in response to the digital ink being entered within a predetermined distance from a right edge of the first display screen of the user interface. Alternatively, or in addition, the method includes blocking input detection from a portion of the first display screen in response to detecting a user is standing or walking. Alternatively, or in addition, the method includes normalizing the digital ink provided to the input panel. Alternatively, or in addition, the input panel comprises at least two lines and digital ink is to be stored from a first line in response to detecting digital ink in a second line. Alternatively, or in addition, the method includes detecting a mixture of text and at least one diagram in the digital ink and normalizing the text and capturing the diagram without normalization. Alternatively, or in addition, the method includes detecting a selection of committed text from the second display screen and moving the selection to the input panel of the first display screen for a revision. Alternatively, or in addition, the method includes detecting a selection of committed text from the second display screen and detecting an annotation corresponding to the committed text. Alternatively, or in addition, a single display screen displays the user interface associated with the first display screen and the second display screen.

EXAMPLE 3

In yet another embodiment, one or more computer-readable storage media for detecting digital ink can include a plurality of instructions that, in response to being executed by a processor, cause the processor to detect an environmental characteristic of a system. The plurality of instructions can also cause the processor to modify a user interface mode based on the environmental characteristic, the user interface mode to modify an input panel of a first display screen of a user interface for detecting the digital ink. Additionally, the plurality of instructions can cause the processor to store the digital ink provided via the user interface and display the stored digital ink in a second display screen of the user interface.

Alternatively, or in addition, the environmental characteristic comprises a determination of whether the system is in motion or at a rest. Alternatively, or in addition, the environmental characteristic comprises an angle of a hinge residing between the first display screen and the second display screen. Alternatively, or in addition, the environmental characteristic comprises a determination of whether the first display screen and the second display screen are viewed in a landscape mode or a portrait mode. Alternatively, or in addition, the environmental characteristic comprises a determination of whether a user of the system is sitting, walking, or standing. Alternatively, or in addition, the plurality of instructions cause the processor to store the digital ink in response to a timer exceeding a predetermined threshold value. Alternatively, or in addition, the plurality of instructions cause the processor to store the digital ink in response to the digital ink being entered within a predetermined distance from a right edge of the first display screen of the user interface. Alternatively, or in addition, the plurality of instructions cause the processor to block input detection from a portion of the first display screen in response to detecting a user is standing or walking. Alternatively, or in addition, the plurality of instructions cause the processor to normalize the digital ink provided to the input panel. Alternatively, or in addition, the input panel comprises at least two lines and digital ink is to be stored from a first line in response to detecting digital ink in a second line. Alternatively, or in addition, the plurality of instructions cause the processor to detect a mixture of text and at least one diagram in the digital ink and normalize the text and capture the diagram without normalization. Alternatively, or in addition, the plurality of instructions cause the processor to detect a selection of committed text from the second display screen and move the selection to the input panel of the first display screen for a revision. Alternatively, or in addition, the plurality of instructions cause the processor to detect a selection of committed text from the second display screen and detect an annotation corresponding to the committed text. Alternatively, or in addition, a single display screen displays the user interface associated with the first display screen and the second display screen.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system for receiving and displaying digital ink, the system comprising:
   a processor; and
   a memory device to store a plurality of instructions, that in response to an execution by the processor, cause the processor to:
   detect a posture of a user from an environmental characteristic identified by a camera of the system;
   modify an appearance of an input panel based on the posture of the user, the appearance of the input panel to be sized relative to the posture of the user;
   receive digital ink provided via the input panel;
   separate text based handwriting and non-text based handwriting; and
   in response to a commit action detected via the input panel, display the digital ink in a display panel wherein text based handwriting is converted into digital characters and the non-text based handwriting remains unconverted.

2. The system of claim 1, wherein the environmental characteristic comprises a determination of whether the system is in motion or at a rest.

3. The system of claim 1, wherein the input panel is disposed on a first screen and the display panel is disposed on a second screen, and wherein the environmental characteristic comprises an angle of a hinge residing between the first screen and the second screen.

4. The system of claim 1, wherein the input panel is disposed on a first screen and the display panel is disposed on a second screen, and wherein the environmental characteristic comprises a determination of whether the first screen and the second screen are viewed in a landscape mode or a portrait mode.

5. The system of claim 1, wherein the commit action is the digital ink being entered within a predetermined distance from a right edge of the input panel.

6. The system of claim 1, wherein the plurality of instructions cause the processor to block input detection from a portion of the display panel in response to detecting the user is standing or walking.

7. The system of claim 1, wherein the plurality of instructions cause the processor to normalize the digital ink provided to the input panel.

8. The system of claim 1, wherein the input panel comprises at least two lines of digital ink and the commit action for a first line of digital ink is a detection of digital ink in a second line of digital ink.

9. The system of claim 1, wherein the plurality of instructions cause the processor to detect a mixture of text and at least one diagram in the digital ink and normalize the text and capture the diagram without normalization.

10. The system of claim 1, wherein the input panel is disposed on a first screen and the display panel is disposed on a second screen, and wherein the plurality of instructions cause the processor to detect a selection of committed text from the second screen and move the selection to the input panel of the first screen for a revision.

11. The system of claim 1, wherein the plurality of instructions cause the processor to detect a selection of committed text from a second screen and detect an annotation corresponding to the committed text.

12. The system of claim 1, wherein a single screen displays the input panel and the display panel.

13. A method for receiving and displaying digital ink, the method comprising:
   detecting a posture of a user from an environmental characteristic identified by a camera of a system;
   modifying an appearance of an input panel based on the posture of the user, the appearance of the input panel to be sized relative to the posture of the user;
   receiving the digital ink provided via the input panel;
   separate text based handwriting and non-text based handwriting; and
   in response to a commit action detected via the input panel, displaying the digital ink in a display panel wherein text based handwriting is converted into digital characters and the non-text based handwriting remains unconverted.

14. The method of claim 13, wherein the environmental characteristic comprises a determination of whether the system is in motion or at a rest.

15. The method of claim 13, wherein the input panel is disposed on a first screen and the display panel is disposed on a second screen, and wherein the environmental characteristic comprises an angle of a hinge residing between the first screen and the second screen.

16. The method of claim 13, wherein the input panel is disposed on a first screen and the display panel is disposed on a second screen, and wherein the environmental characteristic comprises a determination of whether the first screen and the second screen are viewed in a landscape mode or a portrait mode.

17. The method of claim 13, wherein the environmental characteristic comprises a determination of a grip of the user holding the system.

18. One or more computer-readable storage media for receiving and displaying digital ink comprising a plurality of instructions that, in response to being executed by a processor, cause the processor to:
   detect a posture of a user from an environmental characteristic identified by a camera of the system;
   modify an appearance of an input based on the posture of the user, the appearance of the input panel to be sized relative to the posture of the user;
   receive digital ink provided via the input panel;
   separate text based handwriting and non-text based handwriting; and
   in response to a commit action detected via the input panel, display the digital ink in a display panel wherein text based handwriting is converted into digital characters and the non-text based handwriting remains unconverted.

19. The system of claim 1, wherein the camera determines the posture of the user as sitting, walking, or standing.

20. The method of claim 13, wherein the camera determines the posture of the user as sitting, walking, or standing.

* * * * *